May 21, 1935.  G. WERNICKE ET AL  2,002,380
PLANT PROPAGATOR, ETC., OR AQUARIUM
Filed March 9, 1932  3 Sheets-Sheet 1
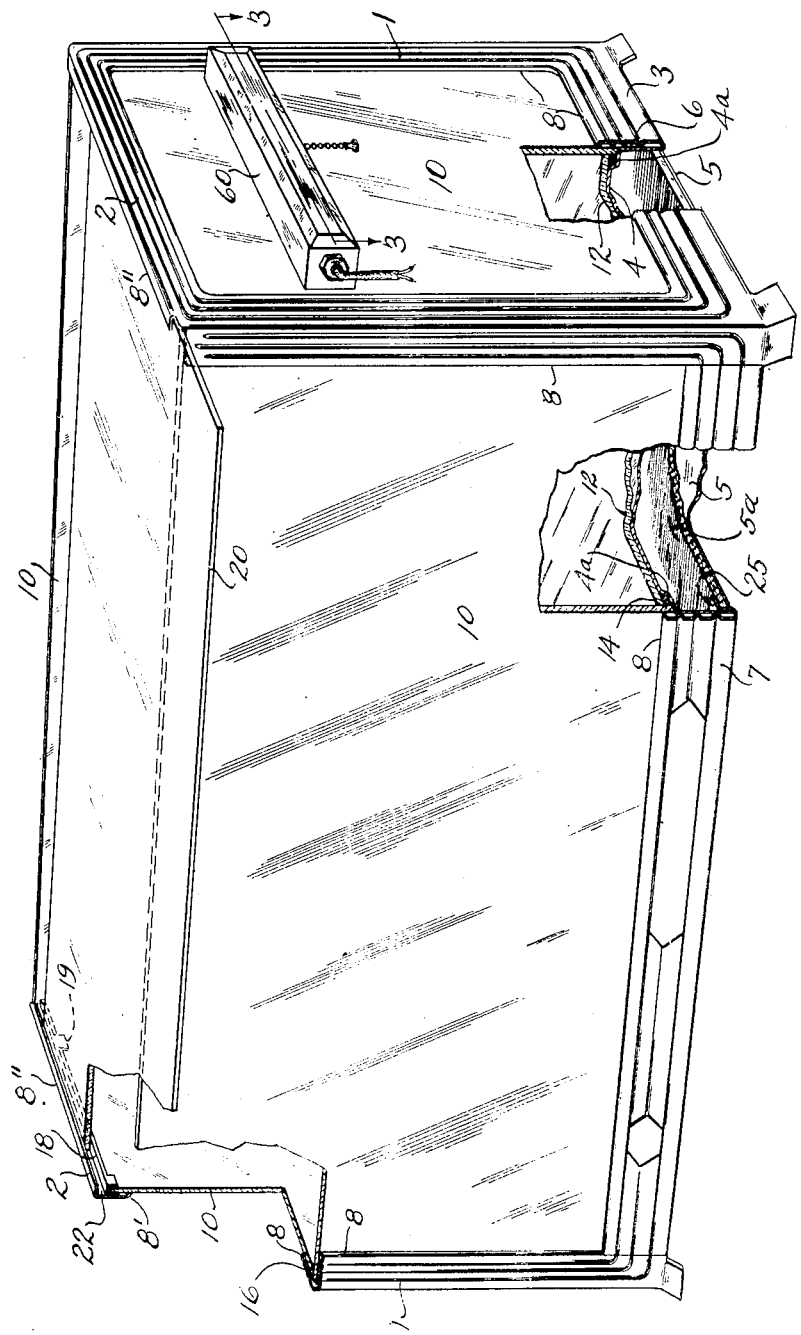
INVENTOR
Gilbert Wernicke
Alfred R. Lintern
By Souls + Leonard
ATTORNEYS

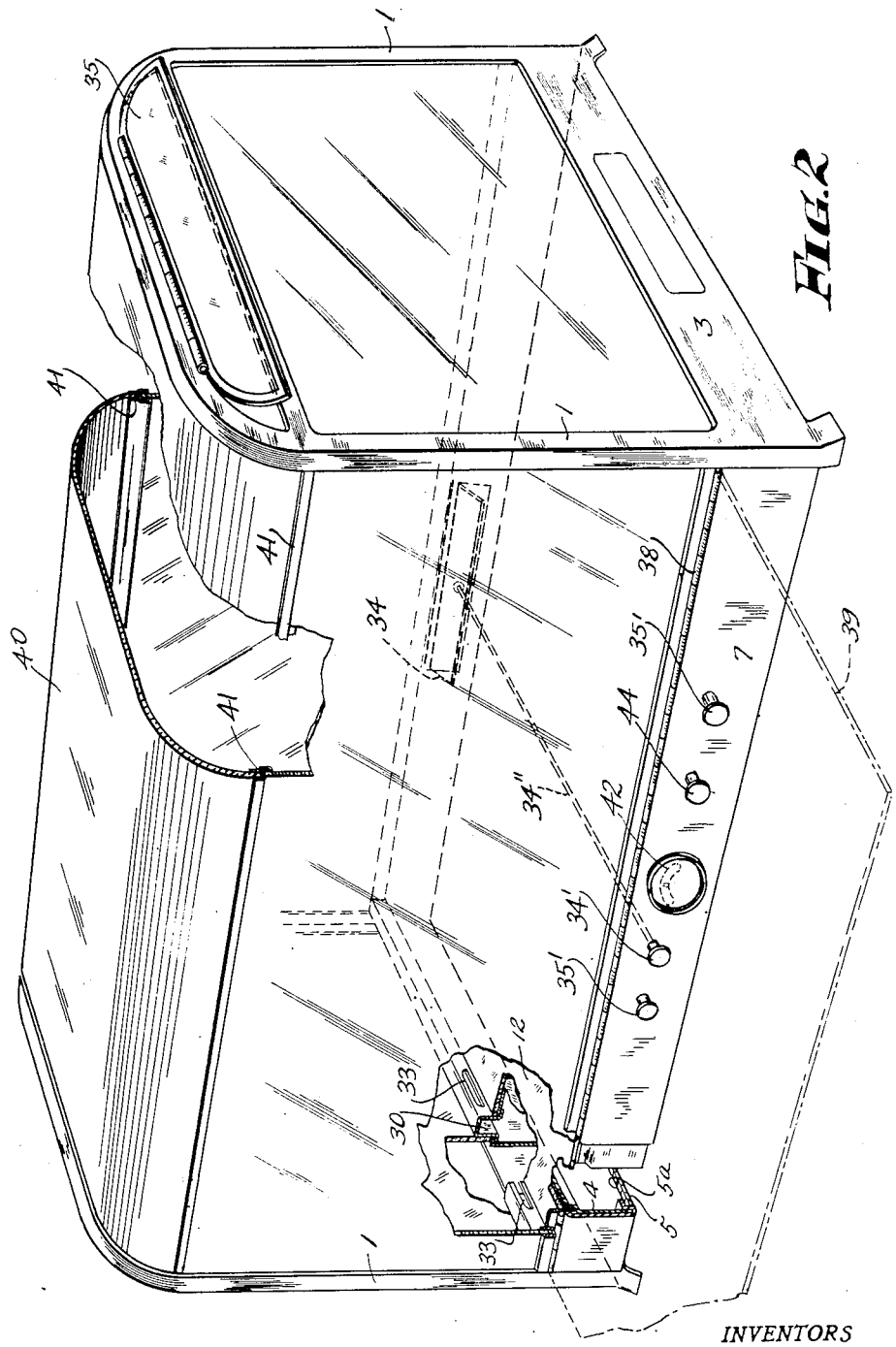

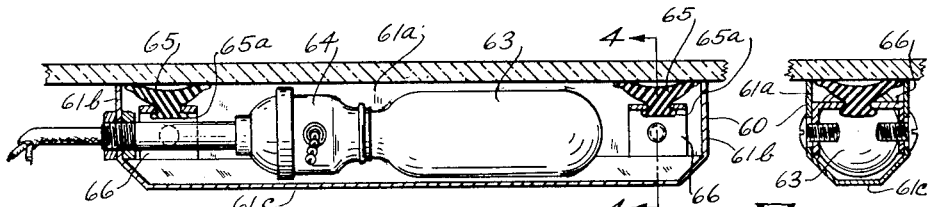
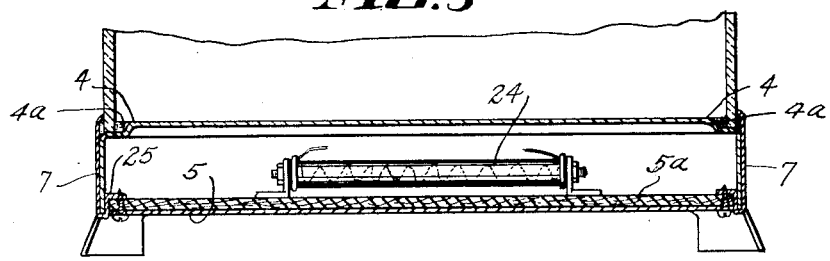
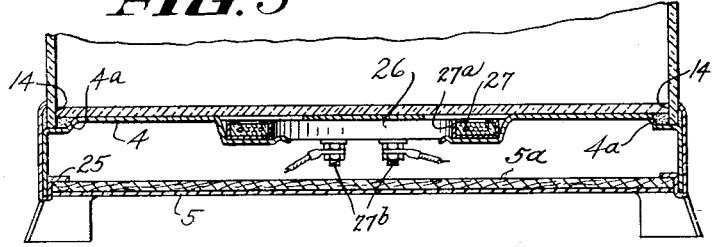
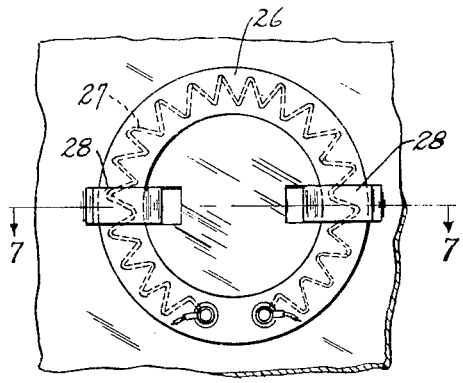
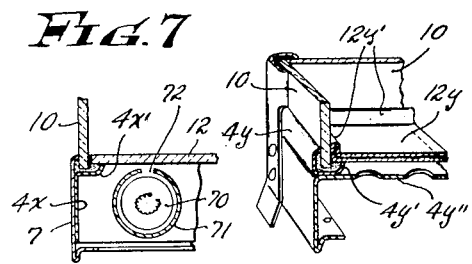
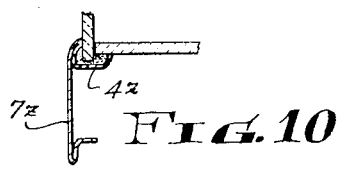

Patented May 21, 1935

2,002,380

UNITED STATES PATENT OFFICE 2,002,380

PLANT PROPAGATOR, ETC., OR AQUARIUM

Gilbert Wernicke and Alfred R. Lintern,
Cleveland, Ohio

Application March 9, 1932, Serial No. 597,722

24 Claims. (Cl. 47—38)

This invention relates to a case for stimulating the germination and growth of living organisms; more specifically for maintaining various flora and fauna under conditions favorable to their growth and health. One object of the present invention is to provide an improved and attractive display case for these purposes, the contents of which case may be viewed from the exterior of the case and lighted by natural or any convenient artificial illumination.

An object is to provide a case which may be economically constructed and assembled for effective use in protecting, stimulating, propagating (etc.) aquatic animal or plant life and which is equally effective in protecting, stimulating, propagating (etc.) land plants.

More specifically, an object is to provide a case suitable as either an aquarium or land plant case, which may be handled and shipped in knocked-down condition and very easily and quickly assembled, for either or both purposes above stated, by the presumably unskilled ultimate user.

Another object is to maintain within such case the degrees of heat and humidity conducive to the growth and health of a large variety of living organisms adapted to be maintained therein.

Another object is to apply adequate heat to the interior of the case most effectively for stimulating the propagation and growth of plant life.

Still another object is to provide a case which will effectively protect the growing flora or fauna from noxious or injurious gases in the atmosphere.

Another object is to provide a case for the purposes herein mentioned which may be very economically made in a large number of different sizes; more particularly in which the parts requiring relatively expensive manufacturing operations are interchangeable in both the smaller and larger sizes.

A specific object is to provide a metal frame construction for a case employing glass or other transparent panels as the main display walls, which frame construction comprises a minimum number of sheet metal parts capable of being very economically produced in large quantities and, moreover, very easily and quickly assembled in mutually bracing relationship.

Still another object is to provide a safe, simple, efficient and easily serviced heating means for a case such as herein described, which will ordinarily require no attention by the operator.

Another object is to provide an enclosure for accomplishing the purposes herein mentioned, which may be economically manufactured and which may be easily assembled by unskilled persons.

Still another object is to provide an attractive and simple device for illuminating the interior of a display case, which device is adaptable without adjustment for use in a large number of positions on the case and on various types and sizes of cases.

Other objects and advantages will become apparent from the following specification, wherein reference is made to the drawings. The essential characteristics are summarized in the claims.

In the drawings, Fig. 1 is a perspective view of one form of the case embodying the principles of this invention, the case being broken away in various places to show the preferred detailed construction; Fig. 2 is a view similar to Fig. 1 but of another embodiment of the invention; Fig. 3 is a sectional view of a suitable illuminating device, as indicated by the line 3—3 on Fig. 1; Fig. 4 is a transverse sectional view of the lighting device, see 4—4 on Fig. 3; Fig. 5 is a transverse sectional view through the base of the case and showing one form of heating element; Fig. 6 is a fragmentary plan view showing a different arrangement of heating element and preferred mounting; Fig. 7 is a sectional view through the base of the case, further illustrating the heating element shown in Fig. 6; Fig. 8 is a fragmentary sectional view on the order of Fig. 5, showing a modified arrangement of base, and (diagrammatically) an adjustable combined illumination and heating device; Fig. 9 is a fragmentary perspective view showing still another arrangement of frame members at the base and a modified corner construction, and Fig. 10 is a fragmentary sectional view of still another modification of base.

The case comprises a rigid frame closed on the sides and ends by glass panels so that the contents of the case is clearly visible from the outside and from practically any angle of view. The frame comprises end frame members, each of which includes uprights or corner posts 1 secured in spaced relation to each other laterally, preferably by both upper and lower lateral members 2 and 3 respectively. The lateral members 2 which are shown comprise transverse bars rigid and preferably integral with the uprights 1, in addition to bracing the upper portions of the uprights, also form elements of a guide rail arrangement for a sliding top panel, as will be hereinafter described. The corner posts and laterals of each end frame member may be formed integral with each other, as castings or stampings, the latter being preferred for reasons which will presently appear. The corner posts are angular in cross section for supporting both end and side glass panels in a manner to be later described.

The bottom of the case comprises, as shown a metal base member 4 in the form of a box which, as shown, is open at the bottom. This may be inexpensively formed from a cross shaped single piece sheet metal blank with the four edge margins bent down to form substantially vertical perimetral side and end walls and substantially closed corners. If made in this way, the corners may be reinforced inside by suitable angles, say welded in place. Due to our improved arrangement however, the base does not require reinforcement in addition to that afforded by the end frame members, as will be presently shown. The base member preferably has a removable base closure plate 5, completing an enclosure for a heating means to be later described. The end frame members are secured to the respective end walls of the base member 4 and preferably, (for greater strength), to the side walls as well, as by screws (not shown) or other suitable, say detachable means, and lie in face-to-face intimate contact with the end walls, as indicated at 6, and similarly in face-to-face intimate contact with portions (at the corners) of the side walls, all the vertical walls of the base member 4 being of sufficient height to present substantial areas to the juxtaposed inner face portions of the end frame members, to thus maintain the latter rigidly in an upright position. The vertical flanges of the box-like base thus co-operate to brace the two end frame members against spreading apart at their upper ends, and the flanged construction of the end frame members sufficiently braces the vertical walls of the base so that the whole frame is unusually sturdy though made of comparatively light sheet metal, and of three very simply formed pieces. Longitudinal finishing strip members 7, preferably identical in size and cross section but cut to the particular length desired for the size of case to be provided, are suitably secured in face-to-face relationship to the side walls of the base member 4 and in endwise abutting relation to the end frame members, as illustrated in Fig. 1. The base closure plate 5 is preferably supported on the base through the medium of the finishing strips 7, as will be hereinafter shown. The terms "ends" and "sides" are of course, used only for convenience both above and in the claims.

On the lower and upper lateral members 2 and 3, the longitudinal members 7, the upright posts 1, and, in fact, wherever the metal terminates in overlying relation to the glass, the marginal areas thereof are turned inwardly of the case to form flanges, as indicated by the numerals 8, the inner edges of these flanges engaging, that is abutting, panels 10 of glass or other suitable transparent material to support the same with the outer marginal portions of the panels in spaced relation to the inner faces of these respective frame members. By this arrangement, the panels and frame members form between them adequate guiding and retaining pockets for receiving sealing material, such as putty or the like, thereby, moreover, forming a hidden seal of the joints between the frame members and the panels and between the panels themselves. When an adequate quantity of putty or the like is placed in the recesses formed between the flanges 8 and adjacent inner surfaces of the frame members, the flanges form guides for the putty so that when the glass is pressed up against the flanges the putty is retained and squeezed along from regions where the quantity of putty is more than adequate to fill the recesses, to regions where there may not be enough. The excess, of course, squeezes out over the free edges of the flanges where it may be easily removed with any sort of scraping tool—say a screw driver or ordinary knife. The putty or other sealing material preferably contains suitable pigment, to cause it to harmonize with in color, or match the finish of, the metal parts of the case.

The floor of the case is preferably covered by a removable plate 12, which is preferably of glass or porcelain or other suitable material impervious to water. The plate 12 is somewhat smaller in area than the floor 4 of the case and terminates in inwardly spaced relation from the planes of the inner edges of the flanges 8 a sufficient distance to substantially abut the inner bottom marginal surfaces of the upright panels 10, as indicated at 14. Thus, the upright longitudinal and end panels 10 may be set in position against the adjacent inturned flanges 8 or 8' of the uprights 1, and the lower margins of the panels will then be substantially engaged by the edges of the plate 12 on the inside, and on the outside by the flanges 8 of the longitudinal members 7 and by the uprights 1, and thus held firmly in place at the bottom.

In order to provide for more effectively sealing the bottom of the glass enclosure, the top surface of the box 4 is stepped down as at 4a at all margins of this surface, forming, as shown, a central plateau on which the plate 12 (if used) rests in overhanging relation to the stepped down portion 4a. Thus a narrow sealing material receiving recess is provided, part of which recess holds and locates the lower edges of side and end glass panels and part of which receives and confines the sealing material (when used) in contact with both the horizontal plate 12 and upright glass paneling. In cases where it is desired to omit the bottom panel 12 from the construction, the recesses formed by the recesses 4a are of advantage, first, as a means for locating the lower edges of the upright glass panels during assembly of the panels in place, and, second, forming a definite recess for sealing material. Such sealing material is in any case (if used) placed all along the recess before the upright glass panels are lowered into place, and when so lowered sufficient sealing material is squeezed outwardly from the recess to fill the respective spaces between the glass and inner upper margins of the strips 7 and cross members 3 of the frame and on the uprights. Then if the bottom plate 12 is used, and put into place last, the sealing material inwardly from the upright glass panels is squeezed along the recess 4a filling the same uniformly, the excess being squeezed upwardly between the outer edges of 12 and the inner lower marginal surfaces of the panels 10 where it may be easily removed with any convenient scraping tool, say an ordinary knife.

Where the bottom plate 12 is of sufficient strength to support, of itself, the contents of the case, the frame may be made in accordance with Figs. 8, 9 or 10 insofar as the bottom construction is concerned.

In Fig. 8, the box-like base member 4x is shown with the central plateau formation omitted and the side and end walls of the base member may be formed in rolled or pressed separate sections, say spot-welded to the side members 7 or transverse members 3 of the end frames 1. Such sections 4x may be attached to each other and reinforced at the corners in a manner above described (by the use of suitable angles). It will be seen that the short shelf 4x', in conjunction with portions of side members, such as 1, which extend above it, forms a channel for receiving and locating the glass paneling 10 and for receiving, retaining and guiding the sealing material (when used). As shown, the bottom plate (any suitable material) rests with its margins overlying the sealing material and substantially in contact with the upstanding flange on the shelf portion 4x'.

Referring to the modification shown in Fig. 9, here flanged angle sections 4y are used at the base to form the channels for the upright paneling and to receive the sealing material. The members 4y may be continuous (all about the base) or may be in sections, say with miter joints at the four corners. As shown, the inner edge of the member 4y has an upwardly extending flange at 4y' functioning similarly to the portions 4a of Fig. 7 or the portions 4x' of Fig. 8 and the channel forming members 4y rest on a box-like structure 4y'' made say in general accordance with the base member 4 of Fig. 1. As a further modification, the base member 4y'' may have suitable openings through the horizontal portion thereof to admit heated air from the base (say in a display case such as shown in Fig. 2) into the display space thereabove. Instead of the flat floor plate 12, the floor plate of Fig. 9, indicated at 12y, has continuous upstanding flanges 12y', substantially abutting the side paneling 10, where shown in section and adapted to be spaced from the paneling 10, say at the ends of the case, so as to provide for conducting air from the base into the display space. The floor plate 12y may be readily made of enamel-ware (metal with a vitreous surface) to serve as a water pan in growing plants requiring an unusual amount of moisture.

Fig. 10 illustrates that the members 4 may be omitted in some cases by forming a channel effect 4z as an integral part of the base side members 1z and corresponding end members of the base.

The end panels 10 are of sufficient width so that their vertical edges abut the inner end marginal faces of the longitudinal panels, as indicated at 16, thus locking the plate 12 and the longitudinal panels 10 in position. In some cases, the removable base plate 12 is not used, in which case the plateau formed by the stepped top surface of the box 4 may be larger in horizontal extent (not illustrated) to reduce the exposed area of sealing material on the inside of the case.

The preferred method of assembling the glass paneling is as follows: The recesses formed by the inturned flanges 8 on the frame and the recesses at 4a are substantially filled with sealing material, as above indicated. The only precautionary measure necessary is to use enough sealing material. Such material is or may be supplied to the user in a collapsible tube with a suitable, say elongated, discharge snout to facilitate the operation in the hands of unskilled persons. The side pannels 10 are then put into place as shown, and, at substantially the same time, the end panels are placed between the side panels and moved into final position against the end members of the case (still abutting the side panels). The bottom plate is then dropped into place with all its outer edges substantially in contact with respective inner surfaces of the side and end panels. The bottom plate is pressed down firmly to squeeze out the excess sealing material which may be simply scraped out of the lower corners as stated above.

Since the lower margins of the end panels are secured in place by the plate 12 and the lower lateral members 3, and since the end panels fully secure the side panels, it will be seen that if the upper ends of the end panels are now secured in position, all of the panels and the base plate 12 will be mutually interlocked with each other and firmly secured in place. To secure the end panels in position, small rib members 18 (see Fig. 1), preferably of right angular cross section, are secured each with one flange in face-to-face relation to the respective upper lateral 2, the other flange overhanging the upper edge of the respective end and forming part of a guide rail arrangement for a sliding top panel to be hereinafter described. These overhanging flanges are provided each with deformable means consisting as shown of one or more inwardly extending clips 19 which may be bent downwardly to engage the inner surfaces of the end panels near the top and thereby hold them firmly against the complementary flanges 8 of the upright posts 1. An inturned flange similar to that provided on the lower lateral members 3 is also provided on the lower edge of the upper lateral members 2, as illustrated, for supporting the end panels, retaining and guiding the sealing material in accordance with the above description. The securing lips may, of course, be formed on the uprights 1 if desired, in which case the angular rib member 18 may be omitted.

The above described arrangement may, of course, be modified to the extent of making the side panels with their upright end edges abutting the inner marginal edges of the end panels (not illustrated), in which case the upper edges of the side panels would be secured say by clips secured to the upper portions of the uprights 1, or lips on said uprights, adapted to be bent in over the top edges of the glass.

The method of assembly may be modified in that the bottom plate 12 may be put into place as a first operation and the vertical glass paneling afterward. We have found that merely dropping the bottom plate 12 into place is, however, entirely practicable because of the air cushioning resulting from the confining effect of the enclosing vertical paneling.

It is desirable that the top of the case be arranged for opening and closing so as to effect the desired ventilation and to provide for easy access to within the case. A top glass panel 20, slidably mounted in the frame, is provided for this purpose. The end edges of the top panel may be merely guided by the upper adjacent portions of the laterals 2 which form edge guide rails for the top panel, and the top panel may slide directly on the upper edges of the end panels 10, but to form a more convenient channel for slidably supporting the panel 20, the ribs 18 are located relative to upper flanges 8'' of the upper laterals 2 so as to form therewith channels, one of which is indicated at 22, Fig. 1. It will be seen that with the top panel supported in the guide rail arrangement and beneath the overhanging flange 8'', the top panel 20 is rigidly supported in various positions of adjustment so that it will not be likely to fall off or be knocked off and broken and, moreover, so that it forms a convenient work shelf for holding small articles incident to preparing a display in the case.

From the foregoing description, it is apparent that a very economical and easily assembled case is provided, which may be supplied to schools, households, hospitals and both wholesale and retail trade generally, in knocked-down condition, thus effecting great saving in shipping and handling. The ultimate user or retailer has merely to attach the upright end frame members to the base and assemble the glass in place as stated above, with or without sealing material, depending on the use of the case desired.

If desired, the interior of the case may be partitioned as by one or more suitable panels of glass or for that matter, any other suitable material which separates one portion of the case from another, allowing one end of the case to be used for plants and the other for aquatic life, for example. In such case, a suitable frame may be provided on the order of the framework heretofore described and the side panels made in sections coming up to and held in such framework in accordance with the above description. A more simple form of partitioned case may comprise simply a section of glass cemented in place upon the bottom glass panel 12 and in intimate contact with the side panels 10.

Referring now to the manner of heating the case, efficient heating requires that the heat be supplied at the bottom of the case and that it be evenly distributed over the case floor. For growing plants, for example, it is desirable to maintain the soil at a proper temperature and preferably at a temperature warmer than the air within the case. By supplying the heat directly to the bottom floor of the case, this result is obtained. Likewise, since the moisture in the case tends to cool and condense on the bottom, heat supplied at this location warms the condensed moisture so that it may pass into the air more easily, and also prevents chilling of the soil by condensation. To effect such heating, an electric resistance heating element 24, operable from the usual domestic service power line outlet, is provided. The heating element is installed beneath the floor of the case, and where the heating feature is to be optional with the buyer, is preferably secured to the removable bottom plate 5, which is or may be sold separately from the case, with the heating elements, service cord, etc. thereon. In the forms illustrated, see particularly Figs. 1, 5 and 7, inturned flanges 25 are provided on the lower margins of the longitudinal members 7, the plate 5 being secured to the flanges 25 by suitable screws, for example. The upper surface of the base plate 5 is preferably covered with asbestos; see 5a or other heat insulation material, likewise the inside surfaces of the base side walls (not shown) to prevent radiation of heat through the base walls, except at the top, thus insuring most efficient utilization of the heat and preventing damage that might otherwise occur to the supporting surface on which the case may be placed. The insulation permits the use of very inexpensive heating elements and greatly reduces current consumption while affording the desired temperatures for the case.

The mounting of the heating element on the removable base plate has a marked advantage in that servicing of the element without disturbing the case or contents, and, furthermore, easy replacement or substitution of heating elements, are possible. Another advantage resides in the fact that the elements are protected from the moisture within the case without the necessity of sealed joints for its protection. As described above, the bottom 4 is preferably of metal or other substance of good heat conducting qualities. The reason for using such material resides in the fact that the heat from the resistance heater elements is conducted rapidly throughout the entire body of material and consequently, is distributed evenly before introduction into the case, and enters the case at substantially the same degree and rate over the entire floor area. Consequently, concentrated heat or unheated areas in the case are eliminated and desirable bottom heat is efficiently supplied to the soil or contents.

Referring to Figs. 6 and 7, these figures show a different arrangement and form of heating element and means for associating such element with the heat conducting floor of the display casing in such manner that heat loss is reduced to a practical minimum. The heating element, as shown, comprises an annulus of refractory material in which is embedded a resistance heating conductor 27, the annulus being contained in the usual metal casing 27a. The conductor is adapted to be connected to the usual domestic power outlet, suitable binding posts for current supply wires being shown at 27b. Suitable clips 28, struck from the metal of the member 4, as shown, hold the metal casing 27a in face to face contact with the under side of the metal bottom 4 of the casing over a substantial area; in other words, the heating element is maintained in direct heat conducting relationship to the metal bottom 4 whereby upon supplying current to the conductor the metal bottom immediately begins to conduct heat emanating from the element for radiation into the enclosure formed by the transparent walls 10. The heat conducting bottom 4 is substantially coextensive with the transparent enclosure thereabove, this being of advantage in that the heat will be more uniformly applied to the entire contents of the case and there will be no tendency for heat received in the casing to localize.

The continuous side walls of the base being contiguous with the metal bottom 4 and substantially imperforate, and the base closure means 5, 5—a being in closing relation to the lower edges of the base side walls, the base members just referred to form a substantially closed air pocket about the heating element preventing heat loss by convection. Both the insulation sheet 5—a and the metal closure member 5 are in spaced relation to the heating element whereby heat loss by conduction directly from the element to the base closure members is minimized. In operation the heat generated by the heating element is immediately transmitted to the heat conducting floor of the display casing and thence, by radiation, to the water or earth e. g. adjacent the floor. The metallic means for associating the heating element with the heat conducting floor member 4 of the casing, namely; the metal jacket 27a for the refractory material embracing the conductor 27 is exemplary only and this means may be greatly modified.

Any desired number of heating elements such as above described or in any other suitable form may be provided (largely depending on the size of case and purpose thereof desired) and individual or common control switches therefor manually or thermostatically operated.

A simple and effective illumination device for the display case herein described is shown at 60 in Figs. 1, 3 and 4. In these figures, there is shown a sheet metal casing having suitable top and bottom walls 61a, end walls 61b and a rear wall 61c. The side of the casing next to the paneling 10 is open to admit light from a suitable light source within the casing to the interior of the display case. As shown, the light source comprises a suitable electric light bulb 63 and conventional socket supportng arrangement therefor, generally indicated at 64. A light filter plate (say of colored glass or pyroxylin) may be mounted in front of the bulb in any convenient manner (not shown).

For securing the casing 61a, etc. with its open face adjacent a selected panel 10, we preferably arranged rubber vacuum cups 65 within the casing 61 on suitable brackets 66. These, as shown, comprise U-shaped metal members perforated to receive suitable heads 65a of the vacuum cups and with their free ends adapted to be secured to the top and bottom walls of the casing. The securing means may comprise screws 66a and the openings therefor through the casing walls may be slots (see clearance shown in Fig. 4) in order that the brackets 66 may be moved in and out. Thus, with the screws set to hold the brackets moved toward the open side of the casing, the cups may be forced into sealing relation to the glass paneling in any desired position on the display case, and the free inner edges of the casing afterward brought directly into abutting relation to the glass, thereafter resetting the screws in the slots to hold the casing in such abutting relation to the paneling.

Another illumination arrangement is shown diagrammatically in Fig. 8 as comprising a suitable bulb 70 (of the type shown in Fig. 3, e. g.) mounted in a tubular casing 71 within the base of the case. Such casing 71 may have an outlet slit as at 72 in one wall thereof and the casing 71 may, moreover, be turnably mounted and the position controlled by a suitable knob or handle projecting through the wall of the base, so that the light may be projected into the case at various angles, and moreover, be entirely cut off if desired; the electric bulbs 70 then serving only as heating elements.

It is to be understood that while we do not claim in this application, the illumination features herein shown, these features may be claimed in a separate application.

Obviously, the display case above described is for numerous uses; for example, germination of seeds and growing of various plants and animal life. It is also suitable for uses as an aquarium having many distinctive advantages, for example, in that the heat is supplied without light, which light would cause the growth of green algae and other undesirable plant growth in the water. A striking advantage as an aquarium is that it may be sold to the trade in knocked-down condition. It is also suitable for the growing of various germ cultures and other forms of life for use in biological laboratories.

In some instances, more elaborate cases are required or desirable. Such a case is illustrated in Fig. 2, which in structural details is substantially similar to the case above described. In addition, however, around the margin of the floor, channels 30, communicating with the hollow box-like bottom of the case are provided. These channels in turn are provided with ventilator openings 33 through which the heated air from the interior of the bottom may pass directly into the case at its sides or ends as desired, and near the bottom for most effective distribution into the case generally. The openings 33 are placed in the wall of the channel 30 sufficiently above the horizontal plane of the floor surface 12 so as to prevent water which may be accidentally spilled on the floor 12 from flowing through said openings into the base.

In order to permit a circulation of air through the heating chamber thus provided and in the interior of the case, a shutter 34 may be provided in the back of the bottom of the display case, so as to permit the inflow of fresh air as from an open window behind the case. In order to vent the case, shutters 35 may be provided near the top located in upper arched portions of the end frames 1, as shown. With this arrangement air may flow into the hollow bottom past the heating element or elements into and through the case, and out through the shutters 35. Such a case is quite desirable for containing plants in pots or individual boxes, and for this purpose the front panel may be hinged, as indicated at 38, so as to open downwardly and outwardly, as indicated by the dot and dash line 39, to provide a tray onto which the contents of the case may be slid from the floor of the case. The hinge swings to a definite "open" limit and is rugged enough to hold the front panel horizontally with considerable weight thereon. In cases of this type, the top comprising, as shown, a single piece arch-shaped glass panel 40 is positioned with its downwardly curved edges substantially in alignment with the side glass panels, said edges being supported preferably on H members 41 which extend longitudinally of the case and which are secured at their ends to the respective end frame members. The flanges of the members 41 substantially close the joint between the edges of the glass panels and protect the edges of the glass against being chipped. Since the front of the case is to open outwardly, one of the forward flanges of the forward H member is removed and small resilient projections (not shown) may be provided, say on the end frame members of the case or on adjacent H member for engaging the front panel when swung upwardly, these projections snapping into place thereover to retain the front panel in the upright position. The vertical edges of the panel 39, that is, the ends of this panel, are not concealed behind the flanges of the corner posts as in the case of the upright glass panels of Fig. 1 but may just clear these flanges, and of course, no sealing material is used in connection with this panel 39. The case may also be provided with a suitable thermostat enclosed in the base for controlling the operation of the heating element or elements in response to the temperature of the case. A thermostat control of the usual type, indicated at 42, is mounted on the front of the base of the case for regulating the temperature to be maintained by the thermostat. Suitable control buttons are likewise slidably mounted on the front wall of the base, as indicated at 34' and 35' these buttons being fastened by suitable connections, one being shown at 34'', to the shutters 34 and 35 respectively, so that the temperature, humidity, ventilation and such features of operation of the case may be controlled from the front. For additionally controlling the operation of the heating element or elements, a suitable number of switches may be provided in the base under the control of suitable buttons, one such being indicated at 44.

We claim:

1. A case for the purposes described, comprising end frame members, a hollow base forming a floor surface for the case and having substantially vertical flanges at its ends, the end frame members being rigidly secured to the base adjacent said flanges in face-to-face relationship therewith to hold the end frame members in upright position, each of said end frame members including corner post portions of angular cross section, separate side and end transparent panels supported at their lower edges by the said floor surface of the base and each vertical edge of the panels being in the embrace of one of said post portions of the end frame members, there being means on said end frame members for securing two respective opposite panels in upright position, the vertical edges of said opposite panels engaging the inner marginal surfaces of the remaining opposite panels to hold the latter in upright position.

2. A case for the purposes described, comprising a base having a top wall and relatively broad vertical end surfaces rigid therewith, separate unitary end frames, each comprising two upright corner post members of angular cross section secured to each other by respective lateral members integral therewith, the lateral members of the end frames being secured in face-to-face relationship with the end surfaces of the base, the corner posts being thereby maintained rigidly upright.

3. A case for the purposes described, comprising a metal base having a top surface adapted to form the floor of the case, panel retaining members at the perimeter of the base and means to secure the members to the base in face-to-face relationship with the perimetral surfaces thereof, said members extending upwardly beyond the plane of the upper and outer margins of said top surface for retaining side wall panels, there being such panels resting on said margins and against the said means, the base having a plateau formed from the metal thereof and being in a plane above said outer margins, for locating the lower edges of said side wall panels, and corner posts for supporting the upper portions of the panels.

4. A case for the purposes described, comprising a base having a top wall, panel retaining means extending upwardly beyond the plane of the top wall at the margins thereof for supporting and retaining the lower edges of upright glass panels in place on the top wall, said top wall of the base having a plateau formed thereon spaced inwardly from the inner vertical surfaces of the glass panels and forming therewith a recess for sealing material, and a floor plate member adapted to lie upon said plateau overhanging said recess and sealing material and with its outer edges in substantially abutting relation to the vertical panels to hold the latter in place against the said panel retaining means.

5. A case for the purposes described, comprising a hollow base adapted to receive and support a heating element, said base having a top wall and substantially vertical perimetral walls, metal frame members including upright posts and connecting members for said posts rigid therewith, the latter members being adapted to be rigidly secured to respective opposite substantially vertical walls of the base, concealing said walls and holding the posts rigidly upright, said connecting members extending above the top wall of the base, finishing strips disposed on the other of said substantially vertical base walls and in abutting relation to said frame members, said finishing strips concealing said substantially vertical base walls and extending above the top wall of the base, there being transparent panels forming an enclosure, said panels being supported on the base in the embrace of said corner posts and with the lower edges supported on the base and concealed behind the portions of the finishing strips and connecting members which extend, as stated, above said top wall.

6. In a display case for aquatic life and analogous uses, an enclosure comprising separate transparent panels, and a metal framework to hold the edge margins of the panels in fixed relation to each other, the framework being characterized by the metal thereof being flanged inwardly to abut the panels near the margins thereof, and providing, in conjunction with the panels, confining pockets for sealing material, and plastic sealing material contained in said pockets substantially filling the same and rendering the enclosure walls impervious to the passage of liquid therethrough at said margins of the panels.

7. In a case for the purposes described, a base and frame members forming a support for upright transparent panels, flanged metal strips, each secured at respective ends to two of said frame members, and resting on the upper edges of the upright panels, and a cover comprising a single sheet of transparent material with downturned side edges, the edges being in substantial alignment with two of the upright panels and engaged by the flanges of said strips as a rigid support.

8. In a case for the purposes described, a base and upper framework including corner posts secured thereto, panels, including transparent wall members, forming an enclosure supported at the lower edges on the base, and maintained in upright position by the upper framework, a hinge at the lower edge of one of said panels to enable the panel to be swung outwardly to provide a substantially horizontally extending work shelf, the elements of said hinge operating as a stop to hold the panel in such horizontal position.

9. In a case for containing and displaying plant or animal life, a three piece metal frame adapted to support transparent panels forming the display walls of the case, said frame comprising a substantially recangular sheet metal base member with flanges forming side and end walls and corners for the base, two unitary upright frame members, each having two upright post portions of substantially right angular cross section adapted to embrace and support the vertical edges of respective juxtaposed panels, each of said frame members extending downwardly from the panel embracing portions in face-to-face embracing contact with corresponding side and end surfaces of the base flanges at the corners of the base, and means for rigidly securing the said frame members to the base, said means maintaining the adjacent surfaces of the frame members and base in face-to-face contact as stated, whereby the post portions of said frame members are held rigidly upright, and the base is reinforced by the said frame members.

10. In a case for the purposes described, a base having a top surface and relatively broad end and side surfaces extending downwardly therefrom, unitary upright metal frame members disposed opposite each other and each having lower portions thereof in face-to-face relationship with three of said downwardly extending surfaces of the base, means to rigidly secure the frame members to the base adjacent respective said surfaces thereof to hold the frame members rigidly in upright position, transparent panels with their vertical edges juxtaposed and forming enclosure walls, the lower edges of said panels being vertically supported by the top surface of the base, and the juxtaposed vertical edges of the panels being respectively confined and horizontally supported in place by the upright frame members.

11. In a case for the purposes described, a base member having substantially vertical end and side surfaces, two separate unitary upright frame members, each providing two frame corner posts of angular cross section, and means to rigidly secure the frame members to the base, each in face-to-face abutting relationship with both end and side surfaces thereof to hold the end frame members rigidly in upright position, panels forming casing walls supported on said base and with their vertical edges juxtaposed in respective frame corners, and means on said frame members inwardly overhanging the upper edges of respective panels for locking the same in upright position.

12. In a casing of the class described, transparent upright display wall panels juxtaposed to form a polygonal enclosure and a corner frame construction for the casing, comprising a sheet metal corner post member of angular cross section adapted to embrace juxtaposed transparent wall panels, both vertical marginal edges of the sheet metal being turned inwardly toward corresponding transparent panels, and plastic sealing material substantially filling the pockets thereby formed between the sheet metal and said transparent panels.

13. A display case for aquatic life and analogous uses, comprising a base, frame members comprising corner posts of angular cross section, secured rigidly to the base in upright position, said posts having inturned marginal flanges, transparent wall panels juxtaposed in intersecting relationship adjacent respective flanges of said posts, said panels being thereby supported in upright position, whereby pockets are formed between the marginal areas of the panels and said post members, and plastic sealing material contained by said pockets and rendering the case impervious to the passage of liquid therefrom at the corners.

14. A display case for aquatic life and analogous uses, comprising a base and frame members rigidly secured thereto, said frame members including corner posts adapted to support transparent enclosure panels in an upright position, horizontally extending members secured to said base at opposite sides of the case and extending between the corner posts and lying in face-to-face relationship with the side edges of the base, said horizontally extending members having inturned marginal flanges adapted to substantially abut said panels on the outer surfaces thereof, said flanges forming in co-operation with the panels, pockets, and plastic sealing material contained in said pockets for sealing the joint between the panels and the base and rendering the base portion of the case impervious to the passage of liquid therethrough.

15. In a casing for the purposes described including a transparent enclosure for plant or animal life, a base, a floor for the casing supported by the base, said floor being of heat conducting material, a heating element disposed below the floor, heat conductive means associating the heating element with the floor whereby the floor will substantially directly conduct heat from the heating element and radiate the same upwardly into the casing from the bottom, a substantially horizontal wall beneath the heating element in spaced relation thereto and secured to the base, and heat insulating means associated with said wall below and in spaced relation to the heating element and arranged to confine the heat radiated thereby and to direct the same toward the said floor.

16. In a casing for plant or animal life, said casing including transparent display walls, a hollow base having top, bottom and substantially upright walls, the top wall of the base forming in effect the floor of said casing, the bottom wall of said base being detachably secured to the base in juxtaposition to the substantially upright walls of the base, closing the base, and a heating element carried on said detachable bottom wall and removable from the base therewith for inspection and service.

17. In a casing for plant or animal life, said casing including transparent display walls, a hollow base, the upper face of said base being substantially horizontal and forming, in effect, the floor of said casing, a heating element carried by said base within the same and beneath the upper face thereof, means for admitting air into said base for heating such air, and means extending above the horizontal plane of said upper face, said means having an opening above said plane for admitting the heated air into the casing while obstructing passage of water into the base from said upper face thereof.

18. In display apparatus for plant or animal life, a casing comprising upright transparent wall members and a floor member, said members being in sealed rigid relationship to each other and forming a water-tight enclosure, and means for closing and adjustably ventilating the interior of the casing, said means comprising substantially horizontal guide rails at the upper edges of two oppositely disposed upright members and a top panel slidably supported on said guide rails.

19. In apparatus according to claim 18 the arrangement wherein the guide rails each embrace respective end surfaces and adjacent top marginal surfaces of said top panel, whereby the top panel is guided and rigidly supported in various horizontal positions of adjustment to thereby serve as a work shelf.

20. In display apparatus for plant or animal life, a casing comprising upright side and end wall panels forming a transparent enclosure, a base including a floor supporting said panels, end frame members secured to said base and each including two upright angular corner posts to receive and support respective panels in upright position, said end frame members each also including a transverse bar rigid with both posts and extending above and in overhanging relation to the upper edges of adjacent end panels to form substantially horizontal guide rails at said upper edges of two of said panels, and a top panel slidably supported in said guide rails and arranged to entirely close the top of the casing in one position and to afford ventilation for the interior of the casing in another position.

21. In apparatus of the class described, means forming a transparent protective enclosure for plant or animal life, a base for said means including substantially upright walls and a horizontal metal top wall, the latter forming a floor for the enclosure and being substantially coextensive horizontally with said enclosure, an electric heating element disposed below the horizontal plane of said top wall of the base, and heat conducting means intimately associated with the heating element and in heat conducting contact with the under surface of said top wall of the base over a substantial area thereof, whereby the heat of said element is conducted therefrom by and along the said top wall and radiated by the latter upwardly into all portions of said transparent enclosure.

22. Apparatus according to claim 21 wherein the said substantially upright base walls are continuous, and imperforate and contiguous with the top wall, and there is a bottom wall for the base in spaced relationship to the heating element and forming with the aforesaid walls a substantially closed air space surrounding said heating element for preventing idle dissipation of the heat thereof and protecting surfaces on which the apparatus may rest from damage by such heat.

23. In apparatus of the class described, means forming a transparent enclosure for plant or animal life, said means including spaced upright glass panels, an arched top glass panel having downwardly turned edge portions substantially aligning with respective said upright panels, and means interposed between said downwardly turned edges and respective upright panels and extending lengthwise of said edges and substantially closing the joint between said glass panels.

24. In apparatus of the class described, means forming a transparent enclosure for plant or animal life, said means including spaced upright side glass panels, and an upwardly arched top glass panel arranged to bridge the aforesaid panels, frame means supporting said panels and including arched end members affording closures for the opposite ends of the top panel, and adjustable means on one of said end members for affording communication between the interior of the enclosure and air outside the enclosure for ventilating the enclosure.

GILBERT WERNICKE.
ALFRED R. LINTERN.